(12) United States Patent
Zhao

(10) Patent No.: US 6,585,819 B2
(45) Date of Patent: *Jul. 1, 2003

(54) CLARIFIED THERMOPLASTICS EXHIBITING VERY HIGH NUCLEATION EFFICACY

(75) Inventor: Xiaodong Edward Zhao, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/927,710

(22) Filed: Aug. 11, 2001

(65) Prior Publication Data

US 2003/0073764 A1 Apr. 17, 2003

(51) Int. Cl.$^7$ .................................. C08L 1/00
(52) U.S. Cl. .................... 106/162.1; 524/108; 524/285; 524/238; 524/396
(58) Field of Search ................ 106/162.1; 524/108, 524/285, 238, 396

(56) References Cited

U.S. PATENT DOCUMENTS

| | | | |
|---|---|---|---|
| 3,721,682 A | 3/1973 | Murai et al. | 260/340.7 |
| 4,371,645 A | 2/1983 | Mahaffey, Jr. | 524/108 |
| 4,429,140 A | 1/1984 | Murai et al. | 549/370 |
| 4,562,265 A | 12/1985 | Machell | 549/364 |
| 4,902,807 A | 2/1990 | Kobayashi et al. | 549/364 |
| 5,049,605 A | 9/1991 | Rekers | 524/108 |
| 5,731,474 A | 3/1998 | Scrivens et al. | 568/592 |
| 5,922,793 A | 7/1999 | Amos et al. | 524/159 |
| 5,929,146 A | 7/1999 | Amos et al. | 524/89 |
| 5,981,636 A | 11/1999 | Amos et al. | 524/108 |
| 6,096,811 A | 8/2000 | Amos et al. | 524/89 |
| 6,465,551 B1 * | 10/2002 | Zhao et al. | 524/284 |

FOREIGN PATENT DOCUMENTS

| | | |
|---|---|---|
| JP | 1996-199003 | 8/1996 |
| JP | 1996-325415 | 12/1996 |

* cited by examiner

*Primary Examiner*—Peter D. Mulcahy
(74) *Attorney, Agent, or Firm*—Terry T. Moyer; William S. Parks

(57) ABSTRACT

Certain thermoplastic additives (combinations of clarifying and nucleating compounds) that induce simultaneously low clarity and high nucleation efficacy are provided. Such additives include combinations of certain bicyclic salts (which by themselves induce very high nucleation efficacy) and thermoplastic clarifying agents, including certain dibenzylidene sorbitol acetals and derivatives (hereinafter collectively referred to as "DBSs")(which alone provide very low haze measurements and thus highly desirable clarity characteristics). In comparison, other types of standard thermoplastic nucleators, such as sodium benzoate and sodium 2,2'-methylene-bis-(4,6-di-tert-butylphenyl) phosphate provide relatively high peak crystallization temperatures, but do not combine synergistically with clarifiers, such as DBSs, to provide the same results as for the inventive combination of bicyclic salts and DBSs. Thermoplastic compositions as well as thermoplastic additive packages comprising such inventive nucleator compounds, as well as methods of producing polypropylene compositions and articles made therefrom, are also contemplated within this invention.

88 Claims, No Drawings

CLARIFIED THERMOPLASTICS EXHIBITING VERY HIGH NUCLEATION EFFICACY

FIELD OF THE INVENTION

This invention relates to certain thermoplastic additives that induce simultaneously low clarity and high nucleation efficacy. Such additives include combinations of certain bicyclic salts (which by themselves induce very high nucleation efficacy) and thermoplastic clarifying agents, including certain dibenzylidene sorbitol acetals and derivatives (hereinafter collectively referred to as "DBSs")(which alone provide very low haze measurements and thus highly desirable clarity characteristics). In comparison, other types of standard thermoplastic nucleators, such as sodium benzoate and sodium 2,2'-methylene-bis-(4,6-di-tert-butylphenyl) phosphate provide relatively high peak crystallization temperatures, but do not combine synergistically with clarifiers, such as DBSs, to provide the same results as for the inventive combination of bicyclic salts and DBSs. Thermoplastic compositions as well as thermoplastic additive packages comprising such inventive nucleator compounds, as well as methods of producing polypropylene compositions and articles made therefrom, are also contemplated within this invention.

BACKGROUND OF THE PRIOR ART

All U.S. patents cited below are herein entirely incorporated by reference.

As used herein, the term "thermoplastic" is intended to mean a polymeric material that will melt upon exposure to sufficient heat but will retain its solidified state, but not prior shape without use of a mold or like article, upon sufficient cooling. Specifically, as well, such a term is intended solely to encompass polymers meeting such a broad definition that also exhibit either crystalline or semi-crystalline morphology upon cooling after melt-formation. Particular types of polymers contemplated within such a definition include, without limitation, polyolefins (such as polyethylene, polypropylene, polybutylene, and any combination thereof), polyamides (such as nylon), polyurethanes, polyesters (such as polyethylene terephthalate), and the like (as well as any combinations thereof).

Thermoplastics have been utilized in a variety of end-use applications, including storage containers, medical devices, food packages, plastic tubes and pipes, shelving units, and the like. Such base compositions, however, must exhibit certain physical characteristics in order to permit widespread use. Specifically within polyolefins, for example, uniformity in arrangement of crystals upon crystallization is a necessity to provide an effective, durable, and versatile polyolefin article. In order to achieve such desirable physical properties, it has been known that certain compounds and compositions provide nucleation sites for polyolefin crystal growth during molding or fabrication. Generally, compositions containing such nucleating compounds crystallize at a much faster rate than unnucleated polyolefin. Such crystallization at higher temperatures results in reduced fabrication cycle times and a variety of improvements in physical properties, such as, as one example, stiffness.

Such compounds and compositions that provide faster and or higher polymer crystallization temperatures are thus popularly known as nucleators. Such compounds are, as their name suggests, utilized to provide nucleation sites for crystal growth during cooling of a thermoplastic molten formulation. Generally, the presence of such nucleation sites results in a larger number of smaller crystals. As a result of the smaller crystals formed therein, clarification of the target thermoplastic may also be achieved, although excellent clarity is not always a result. The more uniform, and preferably smaller, the crystal size, the less light is scattered. In such a manner, the clarity of the thermoplastic article itself can be improved. Highly efficient nucleation of thermoplastics, being very important to the thermoplastic industry in order to provide enhanced physical properties and/or faster processing to the target thermoplastic article or composition, is highly desirable in order to reduce costs and provide improved plastics in terms of durability, impact resistance, and the like.

Furthermore, for applications that require good clarity of the thermoplastic (e.g., polyolefin) article itself, there is also a need to provide an additive that induces low haze measurements within the ultimate polyolefin product. A combination of high nucleation efficacy and low haze (e.g., good clarity) is highly desirable; however, to date there are very few alternatives individually to provide effective low haze or high peak crystallization temperatures within the target polyolefin and no real alternatives that provides an effective combination of such characteristics.

The most effective clarifying agent known to the industry and available commercially at this time is also a type of nucleator, namely dibenzylidene sorbitol acetal derivative compounds (again, "DBSs"). Such compounds are typical nucleator compounds, particularly for polypropylene endproducts, and include, without limitation. Compounds such as 1,3-O-2,4-bis(3,4-dimethylbenzylidene) sorbitol, available from Milliken Chemical under the trade name Millad® 3988 (hereinafter referred to as 3,4-DMDBS), 1,3-O-2,4-bis (p-methylbenzylidene) sorbitol, also available from Milliken & Company under the trade name Millad® 3940 (hereinafter referred to asp-MDBS). Again, such compounds provide excellent clarification and relatively effective nucleation characteristics for target polypropylenes and other polyolefins. However, the peak crystallization temperatures provided by such compounds for the aforementioned polyolefins (e.g., polypropylene) could be much lower than for comparative standard and also commercially available nucleators (which, again, do not provide effective clarification measurements). Such nucleators include sodium benzoate, sodium 2,2'-methylene-bis-(4,6-di-tert-butylphenyl) phosphate (from Asahi Denka Kogyo K.K., known as and hereinafter referred to as NA-11), aluminum bis[2,2'-methylene-bis-(4,6-di-tert-butylphenyl)phosphate] with lithium myristate (also from Asahi Denka Kogyo K.K., which is understood to be known as and hereinafter referred to as NA-21), talc, and the like. Such compounds all impart the desirable high polyolefin crystallization temperatures indicative of excellent nucleation capabilities. Attempts have been made to develop a nucleating packaging that exhibits simultaneous high nucleating efficacy and good clarity. One such attempt was to blend commercial nucleating agents (NA-11, NA-21, and the like) with DBSs. Unfortunately, upon mixing and compounding within polypropylene, the resultant formulation with such blends exhibited much worse clarity characteristics than that of DBSs alone. Thus, there was no simultaneous exhibition of inducement of both high peak crystallization temperatures (or other characteristics associated with excellent nucleation efficacy) as well as low haze within target polyolefins. To date, the best all around high nucleating and clarifying agent remains 3,4-DMDBS or p-MDBS. There thus exists a need to develop such simultaneous high-performing polyolefin thermoplastic additives.

Furthermore, a certain class of unsaturated bicyclic compounds, such as bicyclic dicarboxylic acid and salts, have been taught as polyolefin nucleating agents as well within Patent Cooperation Treaty Application WO 98/29494, 98/29495 and 98/29496, all assigned to Minnesota Mining and Manufacturing. The best working examples of this technology are embodied in disodium bicyclo[2.2.1] heptene dicarboxylate and camphanic acid.

The efficacy of nucleating agents is typically measured by the peak crystallization temperature of the polymer compositions containing such nucleating agents. A high polymer peak crystallization is indicative of high nucleation efficacy, which generally translates into fast processing cycle time and more desirable physical properties, such as stiffness/impact balance, etc., for the fabricated parts. Compounds mentioned above all impart relatively high polyolefin crystallization temperatures; however, each also exhibits its own drawback for large-scale industrial applications.

For example, it is very desirable that the effective nucleating compounds exhibit a very high peak crystallization temperature, for example, above 125° C. within homopolymer polypropylene (wherein such peak crystallization temperatures are measured by differential scanning calorimetry in accordance with ASTM Test Method D3417-99 modified to measure at heating and cooling rates of 20° C./minute). A simultaneous clarity of below about 14% (as measured by ASTM D 1003-92) for the same homopolymer propylene at such high peak crystallization temperature levels has, again, heretofore been unattainable. Such a combination of nucleation efficiency and clarity is, again, highly desired and as of yet impossible to provide on a widespread scale for thermoplastics, polyolefins generally, and most specifically poypropylenes. such a test homopolymer propylene formulation.

Beyond high polymer crystallization temperature and good clarity, there are a number of other performance characteristics important for the practical use of such nucleating/clarifying compositions. For example, one of great interest is the compatibility of such compositions with different additives widely used within typical polyolefin (e.g., polypropylene, polyethylene, and the like) plastic articles. As noted previously, calcium stearate compatibility is particularly important. Unfortunately, most of the typical nucleator compounds noted above (such as sodium benzoate, NA-11, disodium bicyclo[2.2.1] heptene dicarboxylate) exhibit deleterious nucleating efficacy when present with such compounds within polyolefin articles. It is generally speculated that the calcium ion from the stearate transfers positions with the sodium ions of the nucleating agents, rendering the nucleating agents ineffective for their intended function. As a result, such compounds sometimes exhibit unwanted plate-out characteristics and overall reduced nucleation performance as measured, for example, by a decrease in crystallization temperature during and after polyolefin processing of greater than 2° C. as compared to the peak crystallization temperature of the nucleated polymer with no calcium stearate present therein. In order to avoid combinations of these standard nucleators and calcium salts, other nonionic acid neutralizers, such as dihydrotalcite (DHT4-A), would be necessary for use in conjunction with such nucleators. Such a combination, however, has proven problematic in certain circumstances due to worsened aesthetic characteristics (e.g., higher haze), and certainly higher costs in comparison with standard calcium salts.

Other problems encountered with the standard nucleators noted above include inconsistent nucleation due to dispersion problems, resulting in stiffness and impact variation in the polyolefin article. Substantial uniformity in polyolefin production is highly desirable because it results in relatively uniform finished polyolefin articles. If the resultant article does not contain a well dispersed nucleating agent, the entire article itself may suffer from a lack of rigidity and low impact strength.

Furthermore, storage stability of nucleator/clarifying compositions is another potential problem with typical thermoplastic nucleators and thus is of enormous importance. Since nucleator compounds are generally provided in powder or granular form to the polyolefin manufacturer, and since uniform small particles of nucleating agents are imperative to provide the requisite uniform dispersion and performance, such compounds must remain as small particles through storage. Certain nucleators, such as sodium benzoate, exhibit high degrees of hygroscopicity such that the powders made therefrom hydrate easily resulting in particulate agglomeration. Such agglomerated particles may require further milling or other processing for deagglomeration in order to achieve the desired uniform dispersion within the target thermoplastic. Furthermore, such unwanted agglomeration due to hydration may also cause feeding and/or handling problems for the user.

These noticeable problems have thus posed significant problems in attempting to provide a simultaneously efficient nucleator/low clarity inducing composition for thermoplastics. However, there still remains a long-felt need to provide a composition for the production of nucleated/clarified thermoplastics that exhibits such simultaneous nucleation efficiency and low clarity within the target articles and formulations. To date, nothing of this type has been accorded the thermoplastic (polyolefin, and succinctly, polypropylene) industries. Thus, highly desired is a compound or composition that exhibits exceptionally high peak crystallization temperatures, low fugitivity, low hygroscopicity, excellent thermal stability, and non-migratory properties within certain target polyolefins, and compatibility with most standard polyolefin additives (such as, most importantly, calcium stearate), as well as excellent clarifying properties.

OBJECTS AND DETAILED DESCRIPTION OF THE INVENTION

Therefore, an object of the invention is to provide a thermoplastic additive composition that simultaneously induces high levels of nucleation efficiency as well as low degrees of haze (and thus excellent clarity) therefor within target thermoplastic articles. Additionally, it is an object of this invention to provide such a nucleator/clarifier additive composition that may be used in various polyolefin media for use in myriad end-uses.

Accordingly, this invention encompasses a composition comprising at least one saturated bicyclic carboxylic salt and at least one thermoplastic clarifying agent, most notably, the broad class of any dibenzylidene alditol acetal or derivative thereof. As well, thermoplastic comprising such a composition and a method of producing such a thermoplastic comprising said composition are also encompassed within this invention. Such a method includes the steps of a) providing a molten thermoplastic formulation; b) introducing to such formulation and mixing therein a composition comprising at least one saturated bicyclic carboxylic salt and at least thermoplastic clarifying agent, most notably, the broad class of any dibenzylidene sorbitol acetal or derivative thereof, and c) allowing the resultant composition of step "b" to cool into a thermoplastic article.

Alternatively, this invention concerns an additive composition that provides both nucleating and clarifying characteristics within thermoplastics, wherein said composition induces a peak crystallization temperature of at least 125° C. and simultaneously a haze measurement of at most 20% for a test homopolymer polypropylene formulation comprising said nucleating agent, wherein the unnucleated test homopolymer propylene exhibits a density of about 0.9 g/cc, a melt flow of about 12 g/10 min, a Rockwell Hardness (R scale) of about 90, a tensile strength of about 4,931 psi, an elongation at yield of about 10%, a flexural modulus of about 203 ksi, an Izod impact strength of about 0.67 ft-lb/in, and a deflection temperature at 0.46 mPa of about 93°, and wherein said formulation comprising said combination is extruded then molded into plaques having dimensions of about 51 mm×76 mm×1.27 mm, wherein said peak crystallization temperature is measured by differential scanning calorimetry in accordance with a modified ASTM Test Method D3417-99 at heating and cooling rates of 20° C./minute, wherein said haze measurements are performed in accordance with ASTM Standard Test Method D1003-61, and wherein the total amount of said additive composition within said test homopolymer is at most 0.35% by weight. Such a combination of compounds is thus preferably at least one nucleating agent and at least one thermoplastic clarifying agent as further defined herein.

It should also be well understood and appreciated by one of ordinary skill within this art that the inventive nucleating agent is defined above as performing to a certain degree within a test polymer formulation, and is not required to be a component within such a test polymer formulation. Thus, although such an inventive nucleating agent must perform to a certain level within a test homopolymer propylene, it may be present within any other type of polymer (such as a thermoplastic), including blends of polymers. The particular polymers within which such an inventive nucleating is effective and useful are listed below in greater detail.

The term "thermoplastic clarifying agent" is intended to encompass any compound that provides improved clarity through haze measurement reduction of a thermoplastic by at least 10% in comparison with such a thermoplastic wherein no clarifying agent is present. Such compounds include DBSs, NA-11, NA-21, and any other compounds that meet this description. As the required saturated bicyclic dicarboxylic salts have not been utilized in combination with such specific clarifying agents in the past, there is no teaching or fair suggestion of such an inventive combination within the thermoplasticindustry or prior art.

Such a combination of specific types of compounds has been found to induce the aforementioned desirous qualities and characteristics of high nucleation efficacy and low haze simultaneously within thermoplastic media. Synergistically, these components appear to react well together to this end; as shown below, the utilization of other typical nucleating agents with dibenzylidene alditol acetal or derivatives thereof (such as dibenzylidene sorbitol acetal, hereinafter DBSs) fails to achieve such a synergistic effect.

The aforementioned saturated bicyclic carboxylic acid salt compounds are defined as organic compounds that contain two or more rings wherein at least two of the said rings share at least two nonadjacent atoms and do not exhibit any double bonds therein.

Some particular, non-limiting examples of such novel nucleator compounds include the metal or organic salts of saturated [2.2.1] bicyclic dicarboxylates, and most preferably of these types of compounds conforming to Formula (I)

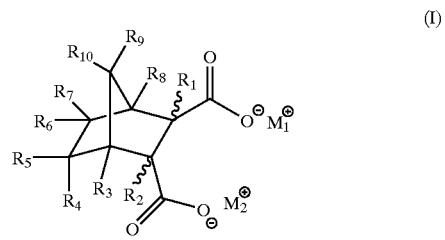

wherein $M_1$ and $M_2$ are the same or different, or $M_1$ and $M_2$ are combined to from a single moiety, and are independently selected from the group consisting of metal or organic cations, and $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxyl, $C_1$–$C_9$ alkoxy, $C_1$–$C_9$ alkyleneoxy, amine, and $C_1$–$C_9$ alkylamine, halogen, phenyl, alkylphenyl, and geminal or vicinal $C_1$–$C_9$ carbocyclic. Preferably, the metal cations are selected from the group consisting of calcium, strontium, barium, magnesium, aluminum, silver, sodium, lithium, rubidium, potassium, and the like. Within that scope, group I and group II metal ions are generally preferred. Among the group I and II cations, sodium, potassium, calcium and strontium are preferred, wherein sodium and calcium are most preferred. Furthermore, the $M_1$ and $M_2$ groups may also be combined to form a single metal cation (such as calcium, strontium, barium, magnesium, aluminum, and the like). Although this invention encompasses all stereochemical configurations of such compounds, the cis configuration is preferred wherein cis-endo is the most preferred embodiment. The preferred embodiment polyolefin articles and additive compositions for polyolefin formulations comprising at least one of such compounds are also encompassed within this invention.

Dibenzylidene alditol acetal or any derivative thereof may be introduced within the inventive fluid dispersion and method. Generally, such compounds are represented by the structure of Formula (II):

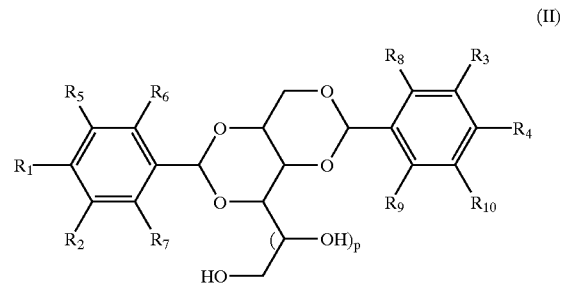

wherein p is 0, 1, or 2; and wherein $R_1$, $R_2$, $R_3$, $R_4$, $R_5$, $R_6$, $R_7$, $R_8$, $R_9$, and $R_{10}$ are each the same or different and are selected from hydrogen, lower alkyl groups containing 1–4 carbon atoms, lower alkoxy groups, halogen, nitro, hydroxy, cyano, or any two adjacent groups are combined to form a carbocyclic, aryl, or methylenedioxy ring. The DBS compound may be symmetrical or asymmetrical as well. Preferably, the dibenzylidene alditol acetal compound is symmetrical and exhibits 3,4-disubstitution of the same or different pendant groups, although such a limitation is not required.

Specific dibenzylidene sorbitol acetal or derivatives include, as merely examples: 1,3:2,4-dibenzylidene sorbitol; 1,3:2,4-di(p-methylbenzylidene) sorbitol; 1,3:2,4-di(p-chlorobenzylidene) sorbitol; 1,3:2,4-di(2,4- dimethyldibenzylidene) sorbitol; 1,3:2,4-di(p-ethylbenzylidene) sorbitol, 1,3:2,4-di(3,4-dimethyldibenzylidene) sorbitol, abbreviated as 3,4-DMBS, 1,3-O-(3,4-dichlorobenzylidene):2,4-O-(3,4-dimethylbenzylidene) sorbitol, 1,3-O-(3,4-dimethylbenzylidene):2,4-O-(3,4-dichlorobenzylidene) sorbitol, 1,3-O-(3,4-difluorobenzylidene):2,4-O-(3,4-dimethylbenzylidene) sorbitol, 1,3-O-(3,4-dimethylbenzylidene):2,4-O-(3,4-difluorobenzylidene) sorbitol, 1,3-O-(3,4-dichlorobenzylidene):2,4-O-(3,4-dimethoxybenzylidene) sorbitol, 1,3-O-(3,4-dimethoxybenzylidene):2,4-O-(3,4-dichlorobenzylidene) sorbitol, 1,3-O-(3,4-dichlorobenzylidene):2,4-O-(5-indanylidene) sorbitol, 1,3-O-(5-indanylidene):2,4-O-(3,4-dichlorobenzylidene) sorbitol, 1,3-O-(4-nitrobenzylidene):2,4-O-(3,4-dimethylbenzylidene) sorbitol, 1,3-O-(3,4-dimethylbenzylidene):2,4-O-(4-nitrobenzylidene) sorbitol, 1,3(4-nitrobenzylidene):2,4-O-(3,4-methylenedioxybenzylidene) sorbitol, 1,3-O-(3,4-methylenedioxybenzylidene):2,4-O-(4-nitrobenzylidene) sorbitol, 1,3-O-(3,4-dichlorobenzylidene):2,4-O-(3,4-dimethylbenzylidene) xylitol, and 1,3-O-(3,4-dimethylbenzylidene):2,4-O-(3,4-dichlorobenzylidene) xylitol, 1,3-O-(4-fluoro-3-methylbenzylidene):2,4-O-(3,4-dimethylbenzylidene) sorbitol, 1,3-O-(3,4-dimethylbenzylidene):2,4-O-(4-fluoro-3-methylbenzylidene) sorbitol, 1,3-O-(4-fluoro-3-methylbenzylidene):2,4-O-(3-fluoro-4-methylbenzylidene) sorbitol, 1,3-O-(3-fluoro-4-methylbenzylidene):2,4-O-(4-fluoro-3-methylbenzylidene) sorbitol, 1,3-O-(4-fluoro-3-methylbenzylidene):2,4-O-(4-chlorobenzylidene) sorbitol, 1,3-O-(4-chlorobenzylidene):2,4-O-(4-fluoro-3-methylbenzylidene) sorbitol, 1,3-O-(4-chloro-3-methylbenzylidene):2,4-O-(3-chloro-4-methylbenzylidene) sorbitol, 1,3-O-(3-chloro-4-methylbenzylidene):2,4-O-(4-chloro-3-methylbenzylidene) sorbitol, 1,3-O-(4-fluoro-3-methylbenzylidene):2,4-O-(5',6',7',8'-tetrahydro-2-napthylidene) sorbitol, 1,3-O-(5',6',7',8'-tetrahydronapthylidene):2,4-O-(4-fluoro-3-methylbenzylidene) sorbitol, 1,3-O-(4-Chloro-3-methylbenzylidene)-2,4-O-(5',6',7',8'-tetrahydro-2-napthylidene) sorbitol, 1,3-O-(5',6',7',8'-tetrahydronapthylidene):2,4-O-(4-chloro-3-methylbenzylidene) sorbitol, 1,3-O-(3-bromo-4-ethylbenzylidene):2,4-O-(3,4-dimethylbenzylidene) sorbitol, 1,3-O-(3-bromo-4-isopropylbenzylidene):2,4-O-(3,4-dimethylbenzylidene) sorbitol, 1,3-O-(3-bromo-4-methylbenzylidene):2,4-O-(3,4-dimethylbenzylidene) sorbitol, 1,3-O-(4-chlorobenzylidene):2,4-O-(3-bromo-4-isopropylbenzylidene) sorbitol, 1,3:2,4-bis(4-chloro-3-methylbenzylidene) sorbitol, 1,3:2,4-bis(3-chloro-4-methylbenzylidene) sorbitol, 1,3:2,4-bis(3-bromo-4-isopropylbenzylidene) sorbitol, 1,3:2,4-bis(3-bromo-4-methylbenzylidene) sorbitol, 1,3:2,4-bis(3-bromo-4-ethylbenzylidene) sorbitol, 1,3-O-(4-fluorobenzylidene):2,4-O-(3,4-dimethylbenzylidene) sorbitol, 1,3-O-(3,4-dimethylbenzylidene):2,4-O-(4-fluorobenzylidene) sorbitol, 1,3-O-(3-fluorobenzylidene):2,4-O-(3,4-dimethylbenzylidene) sorbitol, 1,3-O-(3,4-dimethylbenzylidene):2,4-O-(3-fluorobenzylidene) sorbitol, 1,3-O-(3,4-diemthylbenzylidene):2,4-O-(4-trifluoromethylbenzylidene) sorbitol, 1,3-O-(4-trifluoromethylbenzylidene):2,4-O-(3,4-dimethylbenzylidene) sorbitol, 1,3-O-(4-t-butylbenzylidene):2,4-O-(3,4-dimethylbenzylidene) sorbitol, 1,3-O-(3,4-dimethylbenzylidene):2,4-O-(t-butylbenzylidene) sorbitol, 1,3-O-(3,4-dimethoxybenzylidene):2,4-O-(3,4-dimethylbenzylidene) sorbitol, 1,3-O-(3,4-dimethylbenzylidene):2,4-O-(3,4-dimethoxybenzylidene) sorbitol, 1,3-O-(3,4-methylenedioxybenzylidene):2,4-O-(3,4-dimethylbenzylidene) sorbitol, 1,3-O-(3,4-dimethylbenzylidene):2,4-O-(3,4-methylenedioxybenzylidene) sorbitol, 1,3-O-(4-isopropylbenzylidene):-2,4-O-(3,4-dimethylbenzylidene) sorbitol, 1,3-O-(3,4-dimethylbenzylidene):2,4-O-(4-isopropylbenzylidene) sorbitol, 1,3-O-(3,4-dimethylbeznylidene):2,4-O-(2-naphthylbenzylidene) sorbitol, 1,3-O-(2-naphthylbenzylidene):2,4-O-(3,4-dimethylbenzylidene) sorbitol, 1,3:2,4-bis(4-t-butylbenzylidene) sorbitol, 1,3:2,4-bis(3,4-methylenedioxybenzylidene) sorbitol, bis(4-fluoro-3-methylbenzylidene) sorbitol, and bis(3-fluoro-4-methylbenzylidene) sorbitol.

Of particular interest and the preferred DBS derivative is 3,4-DMBS. Such a diacetal compound, as well as any type of DBS system, may be produced through the condensation reaction between two moles of an aromatic aldehyde and one mole of a polyhydric alcohol. The aldehyde and polyhydric alcohol are generally provided in the reaction mixture in a ratio from 1:1 to 4:1, preferably 1.5:1 to 2.5:1, respectively. The aromatic aldehydes are single or fused double ring aldehydes having at least one unsaturated hydrocarbon ring, and include benzaldehyde, naphthaldehyde, indan aldehyde and tetrahydronaphthaldehyde (tetralin aldehyde). The aromatic aldehydes may be unsubstituted or have from one to five substituent groups selected from $C_{1-4}$ alkyl, $C_{1-4}$ alkoxy, hydroxy, halogen, $C_{1-6}$ alkylthio, $C_{1-6}$ alkylsulfoxy, $C_{3-5}$ alkylene forming a carbocyclic ring with adjacent carbon atoms on an unsaturated hydrocarbon ring, carboxyl, $(C_1-C_{20}$ alkyloxy)carbonyl, $(C_1-C_{20}$ alkyloxy)ethyloxycarbonyl, $(C_1-C_{12}$ alkyl)phenyl, halogenated phenyl, $(C_1-C_{12}$ alkoxy)phenyl, $(C_1-C_{12}$ alkyloxy)ethyloxyethyloxycarbonyl and $(C_1-C_{12}$ alkyloxy)ethyloxyethyloxyethyloxycarbonyl groups. Preferably, the aromatic aldehyde is selected from unsubstituted benzaldehyde, benzaldehyde having from one to three substituent groups selected from $C_{1-4}$ alkyl, halogen and $C_{3-5}$ alkylene forming a carbocyclic ring with adjacent carbon atoms on an unsaturated hydrocarbon ring, including p-methyl, p-ethyl, 2,4-dimethyl, 3,4-dimethyl and 2,4,5-trimethyl benzaldehyde, 5-indan aldehyde and 5', 6', 7', 8'-tetrahydro-2-naphthaldehyde.

Mixtures of the aromatic aldehydes may be provided and will result in a distribution of diacetals having the same or different aromatic components, referred to as symmetric and asymmetric diacetals, respectively. The aromatic aldehydes typically react with the polyhydric alcohol to form acetals in the 1:3 and 2:4 positions. Also within the scope of the present invention are triacetals formed by the condensation of three moles of an aromatic aldehyde and one mole of a polyhydric alcohol having six or more hydroxyl groups. The triacetals are typically formed at the 1:3, 2:4 and 5:6 positions of the alcohol.

The polyhydric alcohols have five or more hydroxyl groups. The sugar alcohols represented by the formula $HOCH_2(CHOH)_n CH_2OH$, where n=3–5, have been found to be especially useful. Preferably, the polyhydric alcohol is a pentahydric or hexahydric alcohol, most preferably xylitol or sorbitol. The polyhydric alcohol can be added to the reaction mixture as a solid, molten liquid, or as an aqueous solution. Preferably, the polyhydric alcohol is concentrated to a syrup by the azeotropic removal of water with a hydrophobic solvent, such as cyclohexane, prior to addition.

One particular method of producing such DBS derivatives is outlined within U.S. Pat. No. 5,731,474, to Scrivens et al., heretofore fully incorporated within this specification.

As noted above, in order to develop a proper polyolefin nucleator/clarifier composition for industrial applications, a number of important criteria need to be met. The inventive nucleating agents meet all of these important requirements very well. For instance, as discussed in greater detail below, these inventive compositions provide excellent high peak crystallization temperatures in a variety of formulations, particularly within polyolefins such as random copolymer polypropylene (hereinafter RCP) and homopolymer polypropylene (hereinafter HP). As a result, such inventive salts provide excellent mechanical properties for polyolefin articles without the need for extra fillers and rigidifying additives, and desirable processing characteristics such as improved (shorter) cycle time. The compositions also exhibit inducement of very low haze measurements for target thermoplastics, particularly the same polyolefins as noted above for the nucleation properties. Thus, highly transparent, efficiently nucleated polyolefins (e.g., polypropylenes) are available with such inventive compositions.

Furthermore, these inventive compositions exhibit other highly desirable characteristics. For example, the inventive compositions show much improved hygroscopicity comparing to prior art and thus granular or powder formulations of such unsaturated bicyclic carboxylic acid salt nucleating agents (e.g., they do not agglomerate or clump together). Additionally, the inventive compositions do not interact deleteriously with commonly found calcium stearate additives. Also, the resultant thermoplastics exhibit desirable flexural modulus properties as well.

Such properties are highly unexpected and unpredictable, particularly in view of the closest prior art that is, again, either DBSs alone or typical nucleating agents alone. Nowhere is there taught or fairly suggested a composition of nucleating agent and clarifying agent that works synergistically as that of the present invention. Thus, the prior art includes the WO 98/29494 reference that merely discloses nucleation and clarification additives for polyolefin articles including unsaturated [2.2.1] dicarboxylate salts; however, there is no exemplification of a saturated dicarboxylate salt of this type, nor is there any suggestion of combining or mixing such a compound with any clarifying agent, not to mention DBSs to provide extremely low haze properties in target thermoplastic media. The closest embodiment within that art is identified as disodium bicyclo[2.2.1]heptene dicarboxylate. After intensive investigations, it was first determined that, quite unexpectedly, the hydrogenation of such compounds provides vastly improved nucleation efficacy for the inventive compounds and within the inventive polyolefin compositions. It has thus been found that the saturation of Diels-Alder reaction products to form dicarboxylate salts, and in particular, without intending to limit the scope of the invention, saturated bicyclic dicarboxylate salts, provide unforeseen benefits for polyolefin nucleation processes. The peak crystallization temperatures provided target polyolefin articles with the saturated bicyclic compounds are from about 2.5 to about 5° C. above that for the related unsaturated compounds. Such dramatic improvements are simply unexpected and are unpredictable from any known empirical or theoretical considerations. Furthermore, significant improvements in hygroscopicity of the saturated compounds were also unexpectedly observed. Such unpredictable improvements are of great practical significance as discussed before. More importantly, the saturated bicyclic nucleating agent(s) exhibit favorable synergistic effects with DBSs. Upon mixing with such DBS (or derivative) compounds, the blends exhibit exceptional nucleation efficacy (as measured by polymer peak crystallization temperature) and excellent clarity (as measured in haze). To the contrary, the unsaturated bicyclic compound mixed with DBSs fails to provide the such improved synergistic effects (as noted below within the Examples). No other typical nucleating agent provides such synergistic effect either (again, see the Examples below).

Also of great surprise was the improved compatibility between the saturated saturated bicyclic carboxylic acid salt compounds and typical acid scavenger salt compounds utilized within polyolefin formulations and articles, such as calcium and lithium stearate. In combination with DBSs, such a composition exhibits excellent stability and comparability with such typical acid scavengers as well. Such compatibility, coupled with the high peak crystallization temperatures available from the inventive compounds, and the low haze measurements accorded the target article by the DBS compounds, thus provides a highly desirable thermoplastic nucleator/clarifier composition.

The inventive compositions are thus added within the target polyolefin in an amount from about 50 ppm to about 20,000 ppm by weight in order to provide the aforementioned beneficial characteristics, most preferably from about 200 to about 4000 ppm. Higher levels, e.g., 50% or more by weight, may also be used in a masterbatch formulation. Optional additives within the inventive salt-containing composition, or within the final polyolefin article made therewith, may include plasticizers, antistatic agents, stabilizers, ultraviolet absorbers, and other similar standard polyolefin thermoplastic additives. Other additives may also be present within this composition, most notably antioxidants, antistatic compounds, antimicrobials (preferably silver-based ion-exchange compounds, such as ALPHASAN® antimicrobials available from Milliken & Company), perfumes, chlorine scavengers, and the like. Such additives, and others not listed, are well known to those skilled in the art.

The individual components (being at least one saturated bicyclic carboxylic acid salt and at least one DBS) are present in amounts from about 10 ppm to about 15,000 ppm each; preferably, from about 100 ppm to about 5,000 ppm each; more preferably from about 200 ppm to about 3,500 ppm each; and most preferably between about 500 ppm and 2,500 ppm each.

The term polyolefin or polyolefin resin is intended to encompass any materials comprised of at least one polyolefin compound. Preferred examples include isotactic and syndiotactic polypropylene, polyethylene, poly(4-methyl) pentene, polybutylene, and any blends or copolymers thereof, whether high or low density in composition. The polyolefin polymers of the present invention may include aliphatic polyolefins and copolymers made from at least one aliphatic olefin and one or more ethylenically unsaturated co-monomers. Generally, the co-monomers, if present, will be provided in a minor amount, e.g., about 10 percent or less or even about 5 percent or less, based upon the weight of the polyolefin (e.g. random copolymer polypropylene), but copolymers containing up to 25% or more of the co-monomer (e.g., impact copolymers) are also envisaged. Other polymers or rubber (such as EPDM or EPR) may also be compounded with the polyolefin to obtain the aforementioned characteristics. Such co-monomers may serve to assist in clarity improvement of the polyolefin, or they may function to improve other properties of the polymer. Other examples include acrylic acid and vinyl acetate, etc. Examples of olefin polymers whose transparency can be improved conveniently according to the present invention are polymers and copolymers of aliphatic monoolefins containing 2 to about 6 carbon atoms which have an average molecular weight of from about 10,000 to about 2,000,000, preferably from about 30,000 to about 300,000, such as, without limitation, polyethylene, linear low density polyethylene, isotactic polypropylene, syndiotactic polypropylene, crystalline ethylene propylene copolymer, poly(1-butene), polymethylpentene, 1-hexene, 1-octene, and vinyl cyclohexane. The polyolefins of the present invention may be described as basically linear, regular polymers that may optionally contain side chains such as are found, for instance, in conventional low density polyethylene.

Although polyolefins are preferred, the nucleating agents of the present invention are not restricted to polyolefins, and may also give beneficial nucleation properties to polyesters such as polyethylene terephthalate (PET), polybutylene terephthalate (PBT), and polyethylene naphthalate (PEN), as well as polyamides such as Nylon 6, Nylon 6,6, and others. Generally, any thermoplastic composition having some crystalline content may be improved with the nucleating agents of the present invention.

The thermoplastic articles of the present invention may be obtained by adding the inventive composition of saturated bicyclic dicarboxylic acid salt (or combination of salts or composition comprising such salts) and DBS to the thermoplastic polymer or copolymer and merely mixing the resultant composition by any suitable means. Alternatively, a concentrate containing as much as about 20 percent by weight of the inventive composition in a polyolefin masterbatch comprising the required acid scavenger may be prepared and be subsequently mixed with the target resin. Furthermore, the inventive compositions (with other additives potentially) may be present in any type of standard thermoplastic (e.g., polyolefin, most preferably) additive form, including, without limitation, powder, prill, agglomerate, liquid suspension, and the like, particularly comprising dispersion aids such as polyolefin (e.g., polyethylene) waxes, stearate esters of glycerin, montan waxes, mineral oil, and the like. Basically, any form may be exhibited by such a combination or composition including such combination made from blending, agglomeration, compaction, and/or extrusion. However, it has been determined that small particle size (below 30 microns on average, more specifically, below 15 microns on average) powders provide better flow properties for the additive and thus are more easily handled and introduced within the target thermoplastic formulation.

The composition may then be processed and fabricated by any number of different techniques, including, without limitation, injection molding, injection blow molding, injection stretch blow molding, injection rotational molding, extrusion, extrusion blow molding, sheet extrusion, film extrusion, cast film extrusion, foam extrusion, thermoforming (such as into films, blown-films, biaxially oriented films), thin wall injection molding, and the like into a fabricated article.

PREFERRED EMBODIMENTS OF THE INVENTION

Examples of particularly preferred fluid dispersions within the scope of the present invention are presented below.

Production of Inventive Salts

EXAMPLE 1

Disodium bicyclo[2.2.1]heptane-2, 3-dicarboxylate

To a solution of disodium bicyclo[2.2.1]heptene-2,3-dicarboxylate (10.0 g) in water (100 g) was added 0.5 g palladium on activated carbon (5 wt %). The mixture was transferred into a Parr reactor and was subjected to hydrogenation (50 psi, room temperature) for 8 hours. The activated carbon was filtered out. Water is removed in vacuo at 75° C. The resulting product was dried and milled (m.p.>300° C.).

EXAMPLE 2 (COMPARATIVE)

Disodium bicyclo[2.2.1]heptene-2,3-dicarboxylate

To a suspension of endo-bicyclo[2.2.1]hept-5-ene-2,3-dicarboxylic anhydride (16.4 g, 0.1 mol) in water (100 g) was added sodium hydroxide (8.0 g, 0.2 mol) at room temperature. The mixture was then stirred at 80 C for 2 hour. A clear, homogeneous solution was obtained. Water was removed in vacuo at 75° C. and the resulting white crystalline product was dried and milled (m.p.>300° C.).

Commercial samples of NA-11, sodium benzoate and Millad® 3988 (3,4-DMDBS) and Millad® 3940 (p-MDBS) were used in this evaluation without further purification and treatment.

Nucleation Efficacy Test:

Thermoplastic compositions (plaques) were produced comprising the additives from the Examples above and sample homopolymer polypropylene (HP) or polypropylene random copolymer resin plaques, produced dry blended in a Welex mixer at ~2000 rpm, extruded through a single screw extruder at 400–450° F., and pelletized. Accordingly, one kilogram batches of target polypropylene were produced in accordance with the following compositions:

Homopolymer Polypropylene Composition

| Component | Amount |
| --- | --- |
| Polypropylene homopolymer (Himont Profax ® 6301) (MF = 12) | 1000 g |
| Irganox ® 1010, Primary Antioxidant (from Ciba) | 500 ppm |
| Irgafos ® 168, Secondary Antioxidant (from Ciba) | 1000 ppm |
| Calcium Stearate, Acid Scavenger | 800 ppm |
| Inventive Nucleator | as noted |

Random Copolymer Polypropylene Composition

| Component | Amount |
| --- | --- |
| Random Copolymer (Indelpro ® SA49F)(MF = 12) | 1000 g |
| Irganox ® 1010, Primary Antioxidant (from Ciba) | 500 ppm |
| Irgafos ® 168, Secondary Antioxidant (from Ciba) | 1000 ppm |
| Calcium Stearate, Acid Scavenger | 800 ppm |
| Inventive Nucleator | as noted |

It is generally known that commercial nucleators (Na-11 and sodium benzoate) are incompatible with calcium stearate. Thus, DHT-4A (400 ppm) instead of calcium stearate was used in formulations containing commercial nucleator.

The base HP [having a density of about 0.9 g/cc, a melt flow of about 12 g/10 min, a Rockwell Hardness (R scale) of about 90, a tensile strength of about 4,931 psi, an elongation at yield of about 10%, a flexural modulus of about 203 ksi, an Izod impact strength of about 0.67 ft-lb/in, and a deflection temperature at 0.46 mPa of about 93° C., as well as an expected isotacticity of between about 96 and 99% through xylene solubles analysis] and all additives were weighed and then blended in a Welex mixer for 1 minute at about 1600 rpm. All samples were then melt compounded on a Killion single screw extruder at a ramped temperature from about 204° to 232° C. through four heating zones. The melt temperature upon exit of the extruder die was about 246° C. The screw had a diameter of 2.54 cm and a length/diameter ratio of 24:1. Upon melting the molten polymer was filtered through a 60 mesh (250 micron) screen. Plaques of the target polypropylene were then made through extrusion into an Arburg 25 ton injection molder. The molder was set at a temperature anywhere between 190 and 260° C., with a range of 190 to 240° C. preferred, most preferably from about 200 to 230° C. and at an injection speed within the range of between about 1 and about 5 cm³/second. The plaques had dimensions of about 51 mm×76 mm×1.27 mm, and the mold had a mirror finish which was transferred to the individual plaques. The mold cooling circulating water was controlled at a temperature of about 25° C.

Testing for nucleating effects and other important criteria were accomplished through the formation of plaques of clarified polypropylene thermoplastic resin. These plaques were formed through the process outlined above with the specific compositions listed above in the above Table.

These plaque formulations are, of course, merely preferred embodiments of the inventive article and method and are not intended to limit the scope of this invention. The resultant plaques were then tested for peak crystallization temperatures (by Differential Scanning Calorimetry). Crystallization is important in order to determine the time needed to form a solid article from the molten polyolefin composition. Generally, a polyolefin such as polypropylene has a crystallization temperature of about 110° C. at a cooling rate of 20° C./min. In order to reduce the amount of time needed to form the final product, as well as to provide the most effective nucleation for the polyolefin, the best nucleator compound added will invariably also provide the highest crystallization temperature for the final polyolefin product. The nucleation composition efficacy, particular polymer peak crystallization temperature ($T_c$), was evaluated by using DSC according to ASTM D-794-85. To measure these temperatures, the specific polypropylene composition was heated from 60° C. to 220° C. at a rate of 20° C. per minute to produce a molten formulation and held at the peak temperature for 2 minutes. At that time, the temperature was then lowered at a rate of 20° C. per minute until it reached the starting temperature of 60° C. The crystallization temperature was thus measured as the peak maximum during the crystallization exotherm. The clarification performance of the nucleators was measured using ASTM D 1003-92.

The following Tables lists the peak crystallization temperatures and percent haze for the plaques prepared above. The listed crystallization temperatures have a statistical error of about +/−0.5° and the listed haze measurements have a statistical error of about 1.0 haze units. Concentration as listed below in % is roughly translated as 0.01%=100 ppm.

EXPERIMENTAL TABLE 1

Performance of Bicyclic Nucleators and DMDBS and p-MDBS blends in Polypropylene Homopolymer

| DMDBS Conc. (%) | p-MDBS Conc. (%) | Example 1 Conc. (%) | Polym. Cryst. Temp (° C.) | % Haze |
|---|---|---|---|---|
| 0.18 | 0 | 0 | 123 | 15% |
| 0.18 | 0 | 0.02 | 124 | 16% |
| 0.18 | 0 | 0.05 | 126 | 17% |
| 0.18 | 0 | 0.1 | 126 | 17% |
| 0.25 | 0 | 0 | 123 | 12% |
| 0.25 | 0 | 0.02 | 124 | 13% |
| 0.25 | 0 | 0.05 | 126 | 13% |
| 0.25 | 0 | 0.1 | 127 | 13% |
| 0 | 0.18 | 0 | 122 | 23% |
| 0 | 0.18 | 0.02 | 124 | 23% |
| 0 | 0.18 | 0.05 | 125 | 22% |
| 0 | 0.18 | 0.1 | 126 | 21% |
| 0 | 0.25 | 0 | 123 | 12% |
| 0 | 0.25 | 0.02 | 124 | 11% |
| 0 | 0.25 | 0.05 | 126 | 12% |
| 0 | 0.25 | 0.1 | 126 | 13% |
| 0.06 | 0.12 | 0 | 122 | 31% |
| 0.06 | 0.12 | 0.02 | 124 | 30% |
| 0.06 | 0.12 | 0.05 | 125 | 28% |
| 0.06 | 0.12 | 0.1 | 126 | 25% |

The data show that the blend of DBS (either DMDBS or p-MDBS) with the inventive product in example 1 exhibit significantly higher polymer peak crystallization temperature and essentially equivalent haze relative to DBS alone.

EXPERIMENTAL TABLE 2

Performance of Bicyclics and DMDBS blends in Polypropylene Random Copolymer

| DMDBS Conc. (%) | Example 1 Conc. (%) | Polym. Cryst. Temp (° C.) | % Haze |
|---|---|---|---|
| 0.15 | 0 | 113.5 | 15.3% |
| 0.15 | 0.02 | 13.9 | 14.9% |
| 0.15 | 0.05 | 114.6 | 15.1% |
| 0.15 | 0.1 | 115 | 15.1% |
| 0.18 | 0 | 113.7 | 10.1% |
| 0.18 | 0.02 | 114.2 | 11.7% |
| 0.18 | 0.05 | 114.7 | 11.7% |
| 0.18 | 0.1 | 115.2 | 12.6% |
| 0.21 | 0 | 114 | 8.6% |
| 0.21 | 0.02 | 114.1 | 9.9% |
| 0.21 | 0.05 | 114.9 | 10.4% |

Thus, similar behavior is observed in random copolymer as in homoplymer. The data show that the blend of DBS (here, DMDBS) with the inventive product in example 1 exhibit higher polymer peak crystallization temperature and slightly worse clarity performance when comparing to DBS alone.

EXPERIMENTAL TABLE 3

(Comparative)
Performance of commercial Nucleators and DMDBS in Polypropylene Homopolymer

| DMDBS Conc. (%) | Conc. (%) (Nucleators) | Polym. Cryst. Temp (C.) | % Haze |
|---|---|---|---|
| 0.18 | 0 | 123 | 15% |
| 0.18 | 0.02 of NA-11 | 123 | 19% |
| 0.18 | 0.05 of NA-11 | 124 | 20% |
| 0.18 | 0.1 of NA-11 | 125 | 21% |
| 0.18 | 0.02 of Example 2 | 123 | 16% |
| 0.18 | 0.05 of Example 2 | 123 | 16% |
| 0.18 | 0.1 of Example 2 | 123 | 18% |
| 0.25 | 0 | 123 | 11% |

EXPERIMENTAL TABLE 3-continued (Comparative)
Performance of commercial Nucleators and DMDBS
in Polypropylene Homopolymer

| DMDBS Conc. (%) | Conc. (%) (Nucleators) | Polym. Cryst. Temp (C.) | % Haze |
|---|---|---|---|
| 0.25 | 0.02 of sodium benzoate | 123 | 13% |
| 0.25 | 0.05 of sodium benzoate | 123 | 16% |
| 0.25 | 0.1 of sodium benzoate | 123 | 21% |
| 0.25 | 0.02 of Example 2 | 123 | 11% |
| 0.25 | 0.05 of Example 2 | 123 | 11% |
| 0.25 | 0.1 of Example 2 | 123 | 13% |

The data show that the blends of DMDBS with commercial nucleators exhibit less or no enhance in polymer peak crystallization temperature and generally significantly higher haze comparing to the inventive blends. The blends of DMDBS with nucleator from example 2 do not cause significant deterioration in clarity performance of the DBS derivative, but fail to provide enhancement in nucleation efficacy.

Thus, at the very least, the combination of clarifying agent and nucleating agent should induce peak crystallization temperature of at least 125° C. (more preferably at least 126° C.) and a haze measurement of at most 20% (preferably, at most 17%, more preferably at most 14%, and most preferably at most 12%) within the test homopolymer when present in a combined amount of at most 0.35% by weight of the test homopolymer itself, in accordance with the analytical procedures outlined above. Clearly, the combination of other standard nucleating agents with DBSs fails to provide such desirable characteristics within the test homopolymer.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. An additive composition of compounds that provides both nucleating and clarifying characteristics within thermoplastics, wherein said additive composition comprises at least two different compounds, a first compound being a saturated bicyclic carboxylic acid salt cyclic compound that induces nucleation within polypropylene and a second compound being an alditol-based polypropylene clarifying compound, wherein said additive composition induces a peak crystallization temperature of at least 125° C. and simultaneously a haze measurement of at most 20% for a test homopolymer polypropylene formulation comprising said nucleating agent, wherein the unnucleated test homopolymer propylene exhibits a density of about 0.9 g/cc, a melt flow of about 12 g/10 mm, a Rockwell Hardness (R scale) of about 90, a tensile strength of about 4,931 psi, an elongation at yield of about 10%, a flexural modulus of about 203 ksi, an Izod impact strength of about 0.67 ft-lb/in, and a deflection temperature at 0.46 mPa of about 93°, and wherein said formulation comprising said combination is extruded then molded into plaques having dimensions of about 51 mm×76 mm×1.27 mm, wherein said peak crystallization temperature is measured by differential scanning calorimetry in accordance with a modified ASTM Test Method D3417-99 at heating and cooling rates of 20° C./minute, wherein said haze measurements are performed in accordance with ASTM Standard Test Method D1003-61, and wherein the total amount of said additive composition present within said test homopolymer is at most 0.35% by weight.

2. The additive composition of claim 1 wherein said first compound is a bicyclic compound.

3. The additive composition of claim 2 wherein said bicyclic compound conforms with the structure of Formula (I)

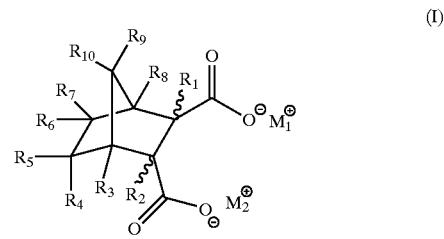

wherein $M_1$ and $M_2$ are the same or different, or $M_1$ and $M_2$ are combined to form a single moiety, and are independently selected from the group consisting of metal or organic cations and hydrogen, and $R_1, R_2, R_3, R_4, R_5, R_6, R_7, R_8, R_9,$ and $R_{10}$ are individually selected from the group consisting of hydrogen, $C_1$–$C_9$ alkyl, hydroxyl, $C_1$–$C_9$ alkoxy, $C_1$–$C_9$ alkyleneoxy, amine, and $C_1$–$C_9$ alkylamine, halogen, phenyl, alkylphenyl, and geminal or vicinal carbocyclic having up to 9 carbon atoms.

4. The composition of claim 3 wherein said metal or organic cation is a metal cation selected from the group consisting of Group I and Group II metal ions.

5. The composition of claim 4 wherein said metal cation is selected from the group consisting of sodium, potassium, calcium, lithium, rubidium, barium, magnesium, and strontium, silver, zinc, aluminum.

6. The composition of claim 5 wherein said metal cation is sodium or calcium.

7. The composition of claim 1 wherein said alditol-based polypropylene clarifying compound is selected from the group consisting of at least one dibenzylidene alditol acetal derivative.

8. The composition of claim 7 wherein said at least one dibenzylidene alditol acetal derivative is selected from the group of compounds represented by the structure of Formula (II)

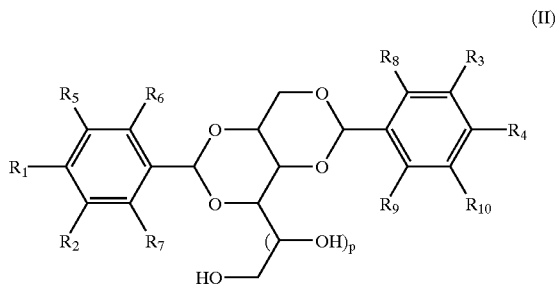

wherein p is 0, 1, or 2; and wherein $R_1, R_2, R_3, R_4, R_5, R_6, R_7, R_8, R_9,$ and $R_{10}$ are each the same or different and are selected from hydrogen, lower alkyl groups containing 1–4 carbon atoms, lower alkoxy groups, halogen, nitro, hydroxy, cyano, or any two adjacent groups are combined to form a carbocyclic or methylenedioxy ring.

9. The composition of claim 8 wherein said dibenzylidene alditol acetal derivative is selected from the group consisting of 1,3:2,4-dibenzylidene sorbitol; 1,3:2,4-di(p-methylbenzylidene) sorbitol; 1,3:2,4-di(p-chlorobenzylidene) sorbitol; 1,3:2,4-di(2,4-dimethyldibenzylidene) sorbitol; 1,3:2,4-di(p-ethylbenzylidene) sorbitol, 1,3:2,4-di(3,4-dimethyldibenzylidene) sorbitol, abbreviated as 3,4-DMBS, 1,3-O-(3,4-dichlorobenzylidene):2,4-O-(3,4-dimethylbenzylidene) sorbitol, 1,3-O-(3,4-dimethylbenzylidene):2,4-O-(3,4-dichlorobenzylidene) sorbitol, 1,3-O-(3,4-difluorobenzylidene):2,4-O-(3,4-dimethylbenzylidene) sorbitol, 1,3-O-(3,4-dimethylbenzylidene):2,4-O-(3,4-difluorobenzylidene) sorbitol, 1,3-O-(3,4-dichlorobenzylidene):2,4-O-(3,4-dimethoxybenzylidene) sorbitol, 1,3-O-(3,4-dimethoxybenzylidene):2,4-O-(3,4-dichlorobenzylidene) sorbitol, 1,3-O-(3,4-dichlorobenzylidene):2,4-O-(5-indanylidene) sorbitol, 1,3-O-(5-indanylidene):2,4-O-(3,4-dichlorobenzylidene) sorbitol, 1,3-O-(4-nitrobenzylidene):2,4-O-(3,4-dimethylbenzylidene) sorbitol, 1,3-O-(3,4-dimethylbenzylidene):2,4-O-(4-nitrobenzylidene) sorbitol, 1,3-O-(4-nitrobenzylidene):2,4-O-(3,4-methylenedioxybenzylidene) sorbitol, 1,3-O-(3,4-methylenedioxybenzylidene):2,4-O-(4-nitrobenzylidene) sorbitol, 1,3-O-(3, 4-dichlorobenzylidene):2,4-O-(3,4-dimethylbenzylidene) xylitol, and 1,3-O-(3,4-dimethylbenzylidene):2,4-O-(3,4-dichlorobenzylidene) xylitol, 1,3-O-(4-fluoro-3-methylbenzylidene):2,4-O-(3,4-dimethylbenzylidene) sorbitol, 1,3-O-(3,4-dimethylbenzylidene):2,4-O-(4-fluoro-3-methylbenzylidene) sorbitol, 1,3-O-(4-fluoro-3-methylbenzylidene):2,4-O-(3-fluoro-4-methylbenzylidene) sorbitol, 1,3-O-(3-fluoro-4-methylbenzylidene):2,4-O-(4-fluoro-3-methylbenzylidene) sorbitol, 1,3-O-(4-fluoro-3-methylbenzylidene):2,4-O-(4-chlorobenzylidene) sorbitol, 1,3-O-(4-chlorobenzylidene):2,4-O-(4-fluoro-3-methylbenzylidene) sorbitol, 1,3-O-(4-chloro-3-methylbenzylidene):2,4-O-(3-chloro-4-methylbenzylidene) sorbitol, 1,3-O-(3-chloro-4-methylbenzylidene):2,4-O-(4-chloro-3-methylbenzylidene) sorbitol, 1,3-O-(4-fluoro-3-methylbenzylidene):2,4-O-(5',6',7',8'-tetrahydro-2-napthylidene) sorbitol, 1,3-O-(5',6',7',8'-tetrahydronapthylidene):2,4-O-(4-fluoro-3-methylbenzylidene) sorbitol, 1,3-O-(4-Chloro-3-methylbenzylidene)-2,4-O-(5',6',7',8'-tetrahydro-2-napthylidene) sorbitol, 1,3-O-(5',6',7',8'-tetrahydronapthylidene):2,4-O-(4-chloro-3-methylbenzylidene) sorbitol, 1,3-O-(3-bromo-4-ethylbenzylidene):2,4-O-(3,4-dimethylbenzylidene) sorbitol, 1,3-O-(3-bromo-4-isopropylbenzylidene):2,4-O-(3,4-dimethylbenzylidene) sorbitol, 1,3-O-(3-bromo-4-methylbenzylidene):2,4-O-(3,4-dimethylbenzylidene) sorbitol, 1,3-O-(4-chlorobenzylidene):2,4-O-(3-bromo-4-isopropylbenzylidene) sorbitol, 1,3:2,4-bis(4-chloro-3-methylbenzylidene) sorbitol, 1,3:2,4-bis(3-chloro-4-methylbenzylidene) sorbitol, 1,3:2,4-bis(3-bromo-4-isopropylbenzylidene) sorbitol, 1,3:2,4-bis(3-bromo-4-methylbenzylidene) sorbitol, 1,3:2,4-bis(3-bromo-4-ethylbenzylidene) sorbitol, 1,3-O-(4-fluorobenzylidene):2,4-O-(3,4-dimethylbenzylidene) sorbitol, 1,3-O-(3,4-dimethylbenzylidene):2,4-O-(4-fluorobenzylidene) sorbitol, 1,3-O-(3-fluorobenzylidene):2,4-O-(3,4-dimethylbenzylidene) sorbitol, 1,3-O-(3,4-dimethylbenzylidene):2,4-O-(3-fluorobenzylidene) sorbitol, 1,3-O-(3,4-diemthylbenzylidene):2,4-O-(4-trifluoromethylbenzylidene) sorbitol, 1,3-O-(4-trifluoromethylbenzylidene):2,4-O-(3,4-dimethylbenzylidene) sorbitol, 1,3-O-(4-t-butylbenzylidene):2,4-O-(3,4-dimethylbenzylidene) sorbitol, 1,3-O-(3,4-dimethylbenzylidene):2,4-O-(t-butylbenzylidene) sorbitol, 1,3-O-(3,4-dimethoxybenzylidene):2,4-O-(3,4-dimethylbenzylidene) sorbitol, 1,3-O-(3,4-dimethylbenzylidene):2,4-O-(3,4-dimethoxybenzylidene) sorbitol, 1,3-O-(3,4-methylenedioxybenzylidene):2,4-O-(3,4-dimethylbenzylidene) sorbitol, 1,3-O-(3,4-dimethylbenzylidene):2,4-O-(3,4-methylenedioxybenzylidene) sorbitol, 1,3-O-(4-isopropylbenzylidene):-2,4-O-(3,4-dimethylbenzylidene) sorbitol, 1,3-O-(3,4-dimethylbenzylidene):2,4-O-(4-isopropylbenzylidene) sorbitol, 1,3-O-(3,4-dimethylbeznylidene):2,4-O-(2-naphthylbenzylidene) sorbitol, 1,3-O-(2-naphthylbenzylidene):2,4-O-(3,4-dimethylbenzylidene) sorbitol, 1,3:2,4-bis(4-t-butylbenzylidene) sorbitol, 1,3:2,4-bis(3,4-methylenedioxybenzylidene) sorbitol, bis(4-fluoro-3-methylbenzylidene) sorbitol, and bis(3-fluoro-4-methylbenzylidene) sorbitol.

10. The composition of claim 9 wherein said dibenzylidene alditol acetal derivative compound is selected from the group consisting of 1,3:2,4-dibenzylidene sorbitol, 1,3:2,4-di(p-methylbenzylidene) sorbitol, 1,3:2,4-di(p-chlorobenzylidene) sorbitol, 1,3:2,4-di(2,4-dimethyldibenzylidene) sorbitol, 1,3:2,4-di(p-ethylbenzylidene) sorbitol, and 1,3:2,4-di(3,4-dimethyldibenzylidene) sorbitol.

11. The composition of claim 10 wherein said dibenzylidene alditol acetal derivative is 1,3:2,4-di(3,4-dimethyldibenzylidene) sorbitol.

12. The additive composition of claim 1 wherein said combination induces a peak crystallization temperature of at least 125° C. and simultaneously a haze measurement of at most 17% for said test homopolymer polypropylene formulation.

13. The additive composition of claim 12, wherein said cyclic compound is a bicyclic compound.

14. The composition of claim 13 wherein said at least one bicyclic compound conforms with the structure of Formula (I)

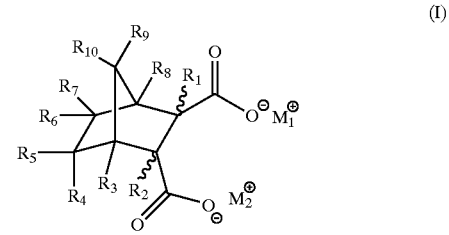

wherein $M_1$ and $M_2$ are the same or different, or $M_1$ and $M_2$ are combined to form a single moiety, and are independently selected from the group consisting of metal or organic cations and hydrogen, and $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxyl, $C_1$–$C_9$ alkoxy, $C_1$–$C_9$ alkyleneoxy, amine, and $C_1$–$C_9$ alkylamine, halogen, phenyl, alkylphenyl, and geminal or vicinal carbocyclic having up to 9 carbon atoms.

15. The composition of claim 14 wherein said metal or organic cation is a metal cation selected from the group consisting of Group I and Group II metal ions.

16. The composition of claim 15 wherein said metal cation is selected from the group consisting of sodium, potassium, calcium, lithium, rubidium, barium, magnesium, and strontium, silver, zinc, aluminum.

17. The composition of claim 16 wherein said metal cation is sodium or calcium.

18. The composition of claim 13 wherein said alditol-based polypropylene clarifying compound is selected from the group consisting of at least one dibenzylidene alditol acetal derivative.

19. The composition of claim 18 wherein said at least one dibenzylidene alditol acetal derivative is selected from the group of compounds represented by the structure of Formula (II)

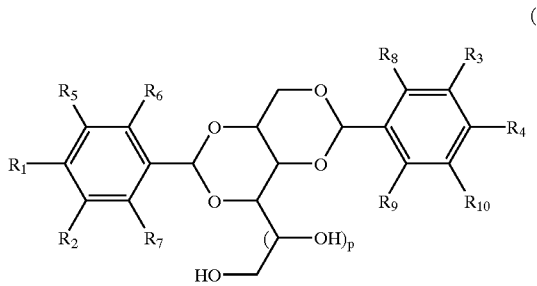

(II)

wherein p is 0, 1, or 2; and wherein $R_1$, $R_2$, $R_3$, $R_4$, $R_5$, $R_6$, $R_7$, $R_8$, $R_9$, and $R_{10}$ are each the same or different and are selected from hydrogen, lower alkyl groups containing 1–4 carbon atoms, lower alkoxy groups, halogen, nitro, hydroxy, cyano, or any two adjacent groups are combined to form a carbocyclic or methylenedioxy ring.

20. The composition of claim 19 wherein said dibenzylidene alditol acetal derivative is selected from the group consisting of 1,3:2,4-dibenzylidene sorbitol; 1,3:2,4-di(p-methylbenzylidene) sorbitol; 1,3:2,4-di(p-chlorobenzylidene) sorbitol; 1,3:2,4-di(2,4-dimethyldibenzylidene) sorbitol; 1,3:2,4-di(p-ethylbenzylidene) sorbitol, 1,3:2,4-di(3,4-dimethyldibenzylidene) sorbitol, abbreviated as 3,4-DMBS, 1,3-O-(3,4-dichlorobenzylidene):2,4-O-(3,4-dimethylbenzylidene) sorbitol, 1,3-O-(3,4-dimethylbenzylidene):2,4-O-(3,4-dichlorobenzylidene) sorbitol, 1,3-O-(3,4-difluorobenzylidene):2,4-O-(3,4-dimethylbenzylidene) sorbitol, 1,3-O-(3,4-dimethylbenzylidene):2,4-O-(3,4-difluorobenzylidene) sorbitol, 1,3-O-(3,4-dichlorobenzylidene):2,4-O-(3,4-dimethoxybenzylidene) sorbitol, 1,3-O-(3,4-dimethoxybenzylidene):2,4-O-(3,4-dimethylbenzylidene) sorbitol, 1,3-O-(3,4-dichlorobenzylidene):2,4-O-(5-indanylidene) sorbitol, 1,3-O-(5-indanylidene):2,4-O-(3,4-dichlorobenzylidene) sorbitol, 1,3-O-(4-nitrobenzylidene):2,4-O-(3,4-dimethylbenzylidene) sorbitol, 1,3-O-(3,4-dimethylbenzylidene):2,4-O-(4-nitrobenzylidene) sorbitol, 1,3-O-(4-nitrobenzylidene):2,4-O-(3,4-methylenedioxybenzylidene) sorbitol, 1,3-O-(3,4-methylenedioxybenzylidene):2,4-O-(4-nitrobenzylidene) sorbitol, 1,3-O-(3,4-dichlorobenzylidene):2,4-O-(3,4-dimethylbenzylidene) xylitol, and 1,3-O-(3,4-dimethylbenzylidene):2,4-O-(3,4-dichlorobenzylidene) xylitol, 1,3-O-(4-fluoro-3-methylbenzylidene):2,4-O-(3,4-dimethylbenzylidene) sorbitol, 1,3-O-(3,4-dimethylbenzylidene):2,4-O-(4-fluoro-3-methylbenzylidene) sorbitol, 1,3-O-(4-fluoro-3-methylbenzylidene):2,4-O-(3-fluoro-4-methylbenzylidene) sorbitol, 1,3-O-(3-fluoro-4-methylbenzylidene):2,4-O-(4-fluoro-3-methylbenzylidene) sorbitol, 1,3-O-(4-fluoro-3-methylbenzylidene):2,4-O-(4-chlorobenzylidene) sorbitol, 1,3-O-(4-chlorobenzylidene):2,4-O-(4-fluoro-3-methylbenzylidene) sorbitol, 1,3-O-(4-chloro-3-methylbenzylidene):2,4-O-(3-chloro-4-methylbenzylidene) sorbitol, 1,3-O-(3-chloro-4-methylbenzylidene):2,4-O-(4-chloro-3-methylbenzylidene) sorbitol, 1,3-O-(4-fluoro-3-methylbenzylidene):2,4-O-(5', 6', 7',8'-tetrahydro-2-napthylidene) sorbitol, 1,3-O-(5',6',7',8'-tetrahydronapthylidene):2,4-O-(4-fluoro-3-methylbenzylidene) sorbitol, 1,3-O-(4-Chloro-3-methylbenzylidene)-2,4-O-(5',6',7',8'-tetrahydro-2-napthylidene) sorbitol, 1,3-O-(5', 6',7',8'-tetrahydronapthylidene):2,4-O-(4-chloro-3-methylbenzylidene) sorbitol, 1,3-O-(3-bromo-4-ethylbenzylidene):2,4-O-(3,4-dimethylbenzylidene) sorbitol, 1,3-O-(3-bromo-4-isopropylbenzylidene):2,4-O-(3,4-dimethylbenzylidene) sorbitol, 1,3-O-(3-bromo-4-methylbenzylidene):2,4-O-(3,4-dimethylbenzylidene) sorbitol, 1,3-O-(4-chlorobenzylidene):2,4-O-(3-bromo-4-isopropylbenzylidene) sorbitol, 1,3:2,4-bis(4-chloro-3-methylbenzylidene) sorbitol, 1,3:2,4-bis(3-chloro-4-methylbenzylidene) sorbitol, 1,3:2,4-bis(3-bromo-4-isopropylbenzylidene) sorbitol, 1,3:2,4-bis(3-bromo-4-methylbenzylidene) sorbitol, 1,3:2,4-bis(3-bromo-4-ethylbenzylidene) sorbitol, 1,3-O-(4-fluorobenzylidene):2,4-O-(3,4-dimethylbenzylidene) sorbitol, 1,3-O-(3,4-dimethylbenzylidene):2,4-O-(4-fluorobenzylidene) sorbitol, 1,3-O-(3-fluorobenzylidene):2,4-O-(3,4-dimethylbenzylidene) sorbitol, 1,3-O-(3,4-dimethylbenzylidene):2,4-O-(3-fluorobenzylidene) sorbitol, 1,3-O-(3,4-diemthylbenzylidene):2,4-O-(4-trifluoromethylbenzylidene) sorbitol, 1,3-O-(4-trifluoromethylbenzylidene):2,4-O-(3,4-dimethylbenzylidene) sorbitol, 1,3-O-(4-t-butylbenzylidene):2,4-O-(3,4-dimethylbenzylidene) sorbitol, 1,3-O-(3,4-dimethylbenzylidene):2,4-O-(t-butylbenzylidene) sorbitol, 1,3-O-(3,4-dimethoxybenzylidene):2,4-O-(3,4-dimethylbenzylidene) sorbitol, 1,3-O-(3,4-dimethylbenzylidene):2,4-(3,4-dimethoxybenzylidene) sorbitol, 1,3-O-(3,4-methylenedioxybenzylidene):2,4-O-(3,4-dimethylbenzylidene) sorbitol, 1,3-O-(3,4-dimethylbenzylidene):2,4-O-(3,4-methylenedioxybenzylidene) sorbitol, 1,3-O-(4-isopropylbenzylidene):-2,4-O-(3,4-dimethylbenzylidene) sorbitol, 1,3-O-(3,4-dimethylbenzylidene):2,4-O-(4-isopropylbenzylidene) sorbitol, 1,3-O-(3,4-dimethylbeznylidene):2,4-O-(2-naphthylbenzylidene) sorbitol, 1,3-O-(2-naphthylbenzylidene):2,4-O-(3,4-dimethylbenzylidene) sorbitol, 1,3:2,4-bis(4-t-butylbenzylidene) sorbitol, 1,3:2,4-bis(3,4-methylenedioxybenzylidene) sorbitol, bis(4-fluoro-3-methylbenzylidene) sorbitol, and bis(3-fluoro-4-methylbenzylidene) sorbitol.

21. The composition of claim 20 wherein said dibenzylidene alditol acetal derivative compound is selected from the group consisting of 1,3:2,4-dibenzylidene sorbitol, 1,3:2,4-di(p-methylbenzylidene) sorbitol, 1,3:2,4-di(p-chlorobenzylidene) sorbitol, 1,3:2,4-di(2,4-dimethyldibenzylidene) sorbitol, 1,3:2,4-di(p-ethylbenzylidene) sorbitol, and 1,3:2,4-di(3,4-dimethyldibenzylidene) sorbitol.

22. The composition of claim 21 wherein said dibenzylidene alditol acetal derivative is 1,3:2,4-di(3,4-dimethyldibenzylidene) sorbitol.

23. The additive composition of claim 1 wherein said composition induces a peak crystallization temperature of at least 125° C. and simultaneously a haze measurement of at most 14% for said test homopolymer polypropylene formulation.

24. The additive composition of claim 23 wherein said cyclic compound is a bicyclic compound.

25. The combination of compounds of claim 24 wherein said at least one bicyclic compound conforms with the structure of Formula (I)

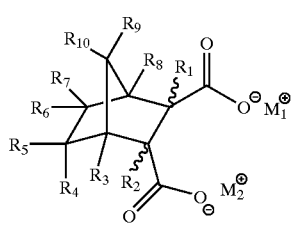

(I)

wherein $M_1$ and $M_2$ are the same or different, or $M_1$ and $M_2$ are combined to form a single moiety, and are independently selected from the group consisting of metal or organic cations and hydrogen, and $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxyl, $C_1$–$C_9$ alkoxy, $C_1$–$C_9$ alkyleneoxy, amine, and $C_1$–$C_9$ alkylamine, halogen, phenyl, alkylphenyl, and geminal or vicinal carbocyclic having up to 9 carbon atoms.

26. The composition of claim 25 wherein said metal or organic cation is a metal cation selected from the group consisting of Group I and Group II metal ions.

27. The composition of claim 26 wherein said metal cation is selected from the group consisting of sodium, potassium, calcium, lithium, rubidium, barium, magnesium, and strontium, silver, zinc, aluminum.

28. The composition of claim 27 wherein said metal cation is sodium or calcium.

29. The composition of claim 23 wherein said alditol-based polypropylene clarifying compound is selected from the group consisting of at least one dibenzylidene alditol acetal derivative.

30. The composition of claim 29 wherein said at least one dibenzylidene alditol acetal derivative is selected from the group of compounds represented by the structure of Formula (II)

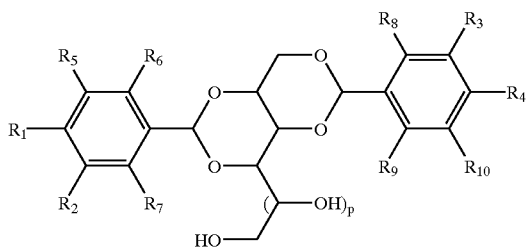

(II)

wherein p is 0, 1, or 2; and wherein $R_1$, $R_2$, $R_3$, $R_4$, $R_5$, $R_6$, $R_7$, $R_8$, $R_9$, and $R_{10}$ are each the same or different and are selected from hydrogen, lower alkyl groups containing 1–4 carbon atoms, lower alkoxy groups, halogen, nitro, hydroxy, cyano, or any two adjacent groups are combined to form a carbocyclic or methylenedioxy ring.

31. The composition of claim 30 wherein said dibenzylidene alditol acetal derivative is selected from the group consisting of 1,3:2,4-dibenzylidene sorbitol; 1,3:2,4-di(p-methylbenzylidene) sorbitol; 1,3:2,4-di(p-chlorobenzylidene) sorbitol; 1,3:2,4-di(2,4-dimethyldibenzylidene) sorbitol; 1,3:2,4-di(p-ethylbenzylidene) sorbitol, 1,3:2,4-di(3,4-dimethyldibenzylidene) sorbitol, abbreviated as 3,4-DMBS, 1,3-O-(3,4-dichlorobenzylidene):2,4-O-(3,4-dimethylbenzylidene) sorbitol, 1,3-O-(3,4-dimethylbenzylidene):2,4-O-(3,4-dichlorobenzylidene) sorbitol, 1,3-O-(3,4-difluorobenzylidene):2,4-O-(3,4-dimethylbenzylidene) sorbitol, 1,3-O-(3,4-dimethylbenzylidene):2,4-O-(3,4-difluorobenzylidene) sorbitol, 1,3-O-(3,4-dichlorobenzylidene):2,4-O-(3,4-dimethoxybenzylidene) sorbitol, 1,3-O-(3,4-dimethoxybenzylidene):2,4-O-(3,4-dichlorobenzylidene) sorbitol, 1,3-O-(3,4-dichlorobenzylidene):2,4-O-(5-indanylidene) sorbitol, 1,3-O-(5-indanylidene):2,4-O-(3,4-dichlorobenzylidene) sorbitol, 1,3-O-(4-nitrobenzylidene): 2,4-O-(3,4-dimethylbenzylidene) sorbitol, 1,3-O-(3,4-dimethylbenzylidene):2,4-O-(4-nitrobenzylidene) sorbitol, 1,3-O-(4-nitrobenzylidene):2,4-O-(3,4-methylenedioxybenzylidene) sorbitol, 1,3-O-(3,4-methylenedioxybenzylidene):2,4-O-(4-nitrobenzylidene) sorbitol, 1,3-O-(3,4-dichlorobenzylidene):2,4-O-(3,4-dimethylbenzylidene) xylitol, and 1,3-O-(3,4-dimethylbenzylidene):2,4-O-(3,4-dichlorobenzylidene) xylitol, 1,3-O-(4-fluoro-3-methylbenzylidene):2,4-O-(3,4-dimethylbenzylidene) sorbitol, 1,3-O-(3,4-dimethylbenzylidene):2,4-O-(4-fluoro-3-methylbenzylidene) sorbitol, 1,3-O-(4-fluoro-3-methylbenzylidene):2,4-O-(3-fluoro-4-methylbenzylidene) sorbitol, 1,3-O-(3-fluoro-4-methylbenzylidene):2,4-O-(4-fluoro-3-methylbenzylidene) sorbitol, 1,3-O-(4-fluoro-3-methylbenzylidene):2,4-O-(4-chlorobenzylidene) sorbitol, 1,3-O-(4-chlorobenzylidene):2,4-O-(4-fluoro-3-methylbenzylidene) sorbitol, 1,3-O-(4-chloro-3-methylbenzylidene):2,4-O-(3-chloro-4-methylbenzylidene) sorbitol, 1,3-O-(3-chloro-4-methylbenzylidene):2,4-O-(4-chloro-3-methylbenzylidene) sorbitol, 1,3-O-(4-fluoro-3-methylbenzylidene):2,4-O-(5',6',7',8'-tetrahydro-2-napthylidene) sorbitol, 1,3-O-(5',6',7',8'-tetrahydronapthylidene):2,4-O-(4-fluoro-3-methylbenzylidene) sorbitol, 1,3-O-(4-Chloro-3-methylbenzylidene)-2,4-O-(5',6',7',8'-tetrahydro-2-napthylidene) sorbitol, 1,3-O-(5',6',7',8'-tetrahydronapthylidene):2,4-O-(4-chloro-3-methylbenzylidene) sorbitol, 1,3-O-(3-bromo-4-ethylbenzylidene):2,4-O-(3,4-dimethylbenzylidene) sorbitol, 1,3-O-(3-bromo-4-isopropylbenzylidene):2,4-O-(3,4-dimethylbenzylidene) sorbitol, 1,3-O-(3-bromo-4-methylbenzylidene):2,4-O-(3,4-dimethylbenzylidene) sorbitol, 1,3-O-(4-chlorobenzylidene):2,4-O-(3-bromo-4-isopropylbenzylidene) sorbitol, 1,3:2,4-bis(4-chloro-3-methylbenzylidene) sorbitol, 1,3:2,4-bis(3-chloro-4-methylbenzylidene) sorbitol, 1,3:2,4-bis(3-bromo-4-isopropylbenzylidene) sorbitol, 1,3:2,4-bis(3-bromo-4-methylbenzylidene) sorbitol, 1,3:2,4-bis(3-bromo-4-ethylbenzylidene) sorbitol, 1,3-O-(4-fluorobenzylidene):2, 4-O-(3,4-dimethylbenzylidene) sorbitol, 1,3-O-(3,4-dimethylbenzylidene):2,4-O-(4-fluorobenzylidene) sorbitol, 1,3-O-(3-fluorobenzylidene):2,4-O-3,4-dimethylbenzylidene) sorbitol, 1,3-O-(3,4-dimethylbenzylidene):2,4-O-(3-fluorobenzylidene) sorbitol, 1,3-O-(3,4-diemthylbenzylidene):2,4-O-(4-trifluoromethylbenzylidene) sorbitol, 1,3-O-(4-trifluoromethylbenzylidene):2,4-O-(3,4-dimethylbenzylidene) sorbitol, 1,3-O-(4-t-butylbenzylidene):2,4-O-(3,4-dimethylbenzylidene) sorbitol, 1,3-O-(3,4-dimethylbenzylidene):2,4-O-(t-butylbenzylidene) sorbitol, 1,3-O-(3,4-dimethoxybenzylidene):2,4-O-(3,4-dimethylbenzylidene)

sorbitol, 1,3-O-(3,4-dimethylbenzylidene):2,4-O-(3,4-dimethoxybenzylidene) sorbitol, 1,3-O-(3,4-methylenedioxybenzylidene):2,4-O-(3,4-dimethylbenzylidene) sorbitol, 1,3-O-(3,4-dimethylbenzylidene):2,4-O-(3,4-methylenedioxybenzylidene) sorbitol, 1,3-O-(4-isopropylbenzylidene):-2,4-O-(3,4-dimethylbenzylidene) sorbitol, 1,3-O-(3,4-dimethylbenzylidene):2,4-O-(4-isopropylbenzylidene) sorbitol, 1,3-O-(3,4-dimethylbeznylidene):2,4-O-(2-naphthylbenzylidene) sorbitol, 1,3-O-(2-naphthylbenzylidene):2,4-O-(3,4-dimethylbenzylidene) sorbitol, 1,3:2,4-bis(4-t-butylbenzylidene) sorbitol, 1,3:2,4-bis(3,4-methylenedioxybenzylidene) sorbitol, bis(4-fluoro-3-methylbenzylidene) sorbitol, and bis(3-fluoro-4-methylbenzylidene) sorbitol.

32. The composition of claim 31 wherein said dibenzylidene alditol acetal derivative compound is selected from the group consisting of 1,3:2,4-dibenzylidene sorbitol, 1,3:2,4-di(p-methylbenzylidene) sorbitol, 1,3:2,4-di(p-chlorobenzylidene) sorbitol, 1,3:2,4-di(2,4-dimethyldibenzylidene) sorbitol, 1,3:2,4-di(p-ethylbenzylidene) sorbitol, and 1,3:2,4-di(3,4-dimethyldibenzylidene) sorbitol.

33. The composition of claim 32 wherein said dibenzylidene alditol acetal derivative is 1,3:2,4-di(3,4-dimethyldibenzylidene) sorbitol.

34. The additive composition of claim 1 wherein said composition induces a peak crystallization temperature of at least 125° C. and simultaneously a haze measurement of at most 12% for said test homopolymer polypropylene formulation.

35. The composition of compounds of claim 34 wherein said cyclic compound is a bicyclic compound.

36. The composition of claim 35 wherein said at least one bicyclic compound conforms with the structure of Formula (I)

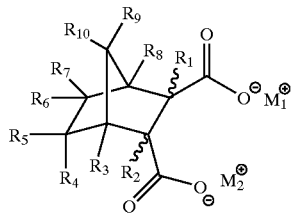

wherein $M_1$ and $M_2$ are the same or different, or $M_1$ and $M_2$ are combined to form a single moiety, and are independently selected from the group consisting of metal or organic cations and hydrogen, and $R_1, R_2, R_3, R_4, R_5, R_6, R_7, R_8, R_9$, and $R_{10}$ are individually selected from the group consisting of hydrogen, $C_1$–$C_9$ alkyl, hydroxyl, $C_1$–$C_9$ alkoxy, $C_1$–$C_9$ alkyleneoxy, amine, and $C_1$–$C_9$ alkylamine, halogen, phenyl, alkylphenyl, and geminal or vicinal carbocyclic having up to 9 carbon atoms.

37. The composition of claim 36 wherein said metal or organic cation is a metal cation selected from the group consisting of Group I and Group II metal ions.

38. The composition of claim 37 wherein said metal cation is selected from the group consisting of sodium, potassium, calcium, lithium, rubidium, barium, magnesium, and strontium, silver, zinc, aluminum.

39. The composition of claim 38 wherein said metal cation is sodium or calcium.

40. The composition of claim 35 wherein said alditol-based polypropylene clarifying compound is selected from the group consisting of at least one dibenzylidene alditol acetal derivative.

41. The composition of claim 40 wherein said at least one dibenzylidene alditol acetal derivative is selected from the group of compounds represented by the structure of Formula (II)

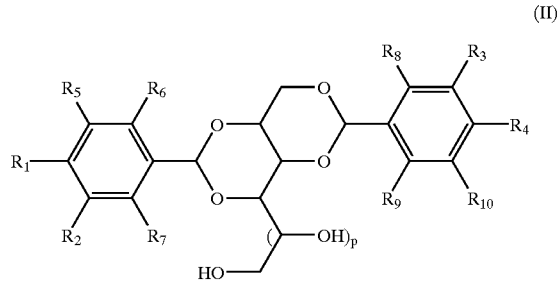

wherein p is 0, 1, or 2; and wherein $R_1, R_2, R_3, R_4, R_5, R_6, R_7, R_8, R_9$, and $R_{10}$ are each the same or different and are selected from hydrogen, lower alkyl groups containing 1–4 carbon atoms, lower alkoxy groups, halogen, nitro, hydroxy, cyano, or any two adjacent groups are combined to form a carbocyclic or methylenedioxy ring.

42. The additive composition of claim 41 wherein said dibenzylidene alditol acetal derivative is selected from the group consisting of 1,3:2,4-dibenzylidene sorbitol; 1,3:2,4-di(p-methylbenzylidene) sorbitol; 1,3:2,4-di(p-chlorobenzylidene) sorbitol; 1,3:2,4-di(2,4-dimethyldibenzylidene) sorbitol; 1,3:2,4-di(p-ethylbenzylidene) sorbitol, 1,3:2,4-di(3,4-dimethyldibenzylidene) sorbitol, abbreviated as 3,4-DMBS, 1,3-O-(3,4-dichlorobenzylidene):2,4-O-(3,4-dimethylbenzylidene) sorbitol, 1,3-O-(3,4-dimethylbenzylidene):2,4-O-(3,4-dichlorobenzylidene) sorbitol, 1,3-O-(3,4-difluorobenzylidene):2,4-O-(3,4-dimethylbenzylidene) sorbitol, 1,3-O-(3,4-dimethylbenzylidene):2,4-O-(3,4-difluorobenzylidene) sorbitol, 1,3-O-(3,4-dichlorobenzylidene):2,4-O-(3,4-dimethoxybenzylidene) sorbitol, 1,3-O-(3,4-dimethoxybenzylidene):2,4-O-(3,4-dichlorobenzylidene) sorbitol, 1,3-O-(3,4-dichlorobenzylidene):2,4-O-(5-indanylidene) sorbitol, 1,3-O-(5-indanylidene):2,4-O-(3,4-dichlorobenzylidene) sorbitol, 1,3-O-(4-nitrobenzylidene):2,4-O-(3,4-dimethylbenzylidene) sorbitol, 1,3-O-(3,4-dimethylbenzylidene):2,4-O-(4-nitrobenzylidene) sorbitol, 1,3-O-(4-nitrobenzylidene):2,4-O-(3,4-methylenedioxybenzylidene) sorbitol, 1,3-O-(3,4-methylenedioxybenzylidene):2,4-O-(4-nitrobenzylidene) sorbitol, 1,3-O-(3,4-dichlorobenzylidene):2,4-O-(3,4-dimethylbenzylidene) xylitol, and 1,3-O-(3,4-dimethylbenzylidene):2,4-O-(3,4-dichlorobenzylidene) xylitol, 1,3-O-(4-fluoro-3-methylbenzylidene):2,4-O-(3,4-dimethylbenzylidene) sorbitol, 1,3-O-(3,4-dimethylbenzylidene):2,4-O-(4-fluoro-3-methylbenzylidene) sorbitol, 1,3-O-(4-fluoro-3-methylbenzylidene):2,4-O-(3-fluoro-4-methylbenzylidene) sorbitol, 1,3-O-(3-fluoro-4-methylbenzylidene):2,4-O-(4-fluoro-3-methylbenzylidene) sorbitol, 1,3-O-(4-fluoro-3-methylbenzylidene):2,4-O-(4-chlorobenzylidene) sorbitol, 1,3-O-(4-chlorobenzylidene):2,4-O-(4-fluoro-3-methylbenzylidene) sorbitol, 1,3-O-(4-chloro-3-methylbenzylidene):2,4-O-(3-chloro-4-methylbenzylidene) sorbitol, 1,3-O-(3-chloro-4-methylbenzylidene):2,4-O-(4-chloro-3-methylbenzylidene) sorbitol, 1,3-O-(4-fluoro-3-methylbenzylidene):2,4-O-(5',6',7',8'-tetrahydro-2- napthylidene) sorbitol, 1,3-O-(5',6',7',8'-tetrahydronapthylidene):2,4-O-(4-fluoro-3-methylbenzylidene) sorbitol, 1,3-O-(4-Chloro-3-methylbenzylidene)-2,4-O-(5',6',7',8'-tetrahydro-2-napthylidene) sorbitol, 1,3-O-(5',6',7',8'-tetrahydronapthylidene):2,4-O-(4-chloro-3-methylbenzylidene) sorbitol, 1,3-O-(3-bromo-4-ethylbenzylidene):2,4-O-(3,4-dimethylbenzylidene) sorbitol, 1,3-O-(3-bromo-4-isopropylbenzylidene):2,4-O-(3,4-dimethylbenzylidene) sorbitol, 1,3-O-(3-bromo-4-methylbenzylidene):2,4-O-(3,4-dimethylbenzylidene) sorbitol, 1,3-O-(4-chlorobenzylidene):2,4-O-(3-bromo-4-isopropylbenzylidene) sorbitol, 1,3:2,4-bis(4-chloro-3-methylbenzylidene) sorbitol, 1,3:2,4-bis(3-chloro-4-methylbenzylidene) sorbitol, 1,3:2,4-bis(3-bromo-4-isopropylbenzylidene) sorbitol, 1,3:2,4-bis(3-bromo-4-methylbenzylidene) sorbitol, 1,3:2,4-bis(3-bromo-4-ethylbenzylidene) sorbitol, 1,3-O-(4-fluorobenzylidene):2,4-O-(3,4-dimethylbenzylidene) sorbitol, 1,3-O-(3,4-dimethylbenzylidene):2,4-O-(4-fluorobenzylidene) sorbitol, 1,3-O-(3-fluorobenzylidene):2,4-O-(3,4-dimethylbenzylidene) sorbitol, 1,3-O-(3,4-dimethylbenzylidene):2,4-O-(3-fluorobenzylidene) sorbitol, 1,3-O-(3,4-diemthylbenzylidene):2,4-O-(4-trifluoromethylbenzylidene) sorbitol, 1,3-O-(4-trifluoromethylbenzylidene):2,4-O-(3,4-dimethylbenzylidene) sorbitol, 1,3-O-(4-t-butylbenzylidene):2,4-O-(3,4-dimethylbenzylidene) sorbitol, 1,3-O-(3,4-dimethylbenzylidene):2,4-O-(t-butylbenzylidene) sorbitol, 1,3-O-(3,4-dimethoxybenzylidene):2,4-O-(3,4-dimethylbenzylidene) sorbitol, 1,3-O-(3,4-dimethylbenzylidene):2,4-O-(3,4-dimethoxybenzylidene) sorbitol, 1,3-O-(3,4-methylenedioxybenzylidene):2,4-O-(3,4-dimethylbenzylidene) sorbitol, 1,3-O-(3,4-dimethylbenzylidene):2,4-O-(3,4-methylenedioxybenzylidene) sorbitol, 1,3-O-(4-isopropylbenzylidene):-2,4-O-(3,4-dimethylbenzylidene) sorbitol, 1,3-O-(3,4-dimethylbenzylidene):2,4-O-(4-isopropylbenzylidene) sorbitol, 1,3-O-(3,4-dimethylbeznylidene):2,4-O-(2-naphthylbenzylidene) sorbitol, 1,3-O-(2-naphthylbenzylidene):2,4-O-(3,4-dimethylbenzylidene) sorbitol, 1,3:2,4-bis(4-t-butylbenzylidene) sorbitol, 1,3:2,4-bis(3,4-methylenedioxybenzylidene) sorbitol, bis(4-fluoro-3-methylbenzylidene) sorbitol, and bis(3-fluoro-4-methylbenzylidene) sorbitol.

43. The composition of claim 42 wherein said dibenzylidene alditol acetal derivative compound is selected from the group consisting of 1,3:2,4-dibenzylidene sorbitol, 1,3:2,4-di(p-methylbenzylidene) sorbitol, 1,3:2,4-di(p-chlorobenzylidene) sorbitol, 1,3:2,4-di(2,4-dimethyldibenzylidene) sorbitol, 1,3:2,4-di(p-ethylbenzylidene) sorbitol, and 1,3:2,4-di(3,4-dimethyldibenzylidene) sorbitol.

44. The composition of claim 43 wherein said dibenzylidene alditol acetal derivative is 1,3:2,4-di(3,4-dimethyldibenzylidene) sorbitol.

45. A polyolefin composition comprising the composition as defined in claim 1.
46. A polyolefin composition comprising the composition as defined in claim 2.
47. A polyolefin composition comprising the composition as defined in claim 3.
48. A polyolefin composition comprising the composition as defined in claim 4.
49. A polyolefin composition comprising the composition as defined in claim 5.
50. A polyolefin composition comprising the composition as defined in claim 6.
51. A polyolefin composition comprising the composition as defined in claim 7.
52. A polyolefin composition comprising the composition as defined in claim 8.
53. A polyolefin composition comprising the composition as defined in claim 9.
54. A polyolefin composition comprising the composition as defined in claim 10.
55. A polyolefin composition comprising the composition as defined in claim 11.
56. A polyolefin composition comprising the composition as defined in claim 12.
57. A polyolefin composition comprising the composition as defined in claim 13.
58. A polyolefin composition comprising the composition as defined in claim 14.
59. A polyolefin composition comprising the composition as defined in claim 15.
60. A polyolefin composition comprising the composition as defined in claim 16.
61. A polyolefin composition comprising the composition as defined in claim 17.
62. A polyolefin composition comprising the composition as defined in claim 18.
63. A polyolefin composition comprising the composition as defined in claim 19.
64. A polyolefin composition comprising the composition as defined in claim 20.
65. A polyolefin composition comprising the composition as defined in claim 21.
66. A polyolefin composition comprising the composition as defined in claim 22.
67. A polyolefin composition comprising the composition as defined in claim 23.
68. A polyolefin composition comprising the composition as defined in claim 24.
69. A polyolefin composition comprising the composition as defined in claim 25.
70. A polyolefin composition comprising the composition as defined in claim 26.
71. A polyolefin composition comprising the composition as defined in claim 27.
72. A polyolefin composition comprising the composition as defined in claim 28.
73. A polyolefin composition comprising the composition as defined in claim 29.
74. A polyolefin composition comprising the composition as defined in claim 30.
75. A polyolefin composition comprising the composition as defined in claim 31.
76. A polyolefin composition comprising the composition as defined in claim 32.
77. A polyolefin composition comprising the composition as defined in claim 33.
78. A polyolefin composition comprising the composition as defined in claim 34.
79. A polyolefin composition comprising the composition as defined in claim 35.
80. A polyolefin composition comprising the composition as defined in claim 36.
81. A polyolefin composition comprising the composition as defined in claim 37.
82. A polyolefin composition comprising the composition as defined in claim 38.
83. A polyolefin composition comprising the composition as defined in claim 39.

84. A polyolefin composition comprising the composition as defined in claim 40.

85. A polyolefin composition comprising the composition as defined in claim 41.

86. A polyolefin composition comprising the composition as defined in claim 42.

87. A polyolefin composition comprising the composition as defined in claim 43.

88. A polyolefin composition comprising the composition as defined in claim 44.

* * * * *

UNITED STATES PATENT AND TRADEMARK OFFICE
CERTIFICATE OF CORRECTION

PATENT NO. : 6,585,819 B2
DATED : July 1, 2003
INVENTOR(S) : Xiaodong Edward Zhao It is certified that error appears in the above-identified patent and that said Letters Patent is hereby corrected as shown below:

Column 15,
Line 49, delete "cyclic".
Line 58, remove the abbreviation "mm" and insert the abbreviation -- min --.

Column 20,
Line 36, insert the number -- 0 --, after "2,4-" but before "(3,4-".

Signed and Sealed this

Fourth Day of January, 2005

JON W. DUDAS
*Director of the United States Patent and Trademark Office*